(12) United States Patent
Wang et al.

(10) Patent No.: US 9,507,989 B2
(45) Date of Patent: Nov. 29, 2016

(54) DECODING BARCODE USING SMART LINEAR PICKLIST

(71) Applicant: SYMBOL TECHNOLOGIES, INC., Schaumburg, IL (US)

(72) Inventors: Dayou Wang, Mount Sinai, NY (US); Daniel F Brown, E Northport, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/259,860

(22) Filed: Apr. 23, 2014

(65) Prior Publication Data

US 2015/0310246 A1    Oct. 29, 2015

(51) Int. Cl.
  *G06K 7/10* (2006.01)
  *G06K 19/06* (2006.01)
  *G06K 7/14* (2006.01)

(52) U.S. Cl.
  CPC ......... *G06K 7/1443* (2013.01); *G06K 7/10831* (2013.01); *G06K 7/1404* (2013.01)

(58) Field of Classification Search
  CPC . G06K 7/1404; G06K 7/1439; G06K 7/1443
  USPC .............................. 235/454, 462.01–462.49, 235/472.01–472.03
  See application file for complete search history.

(56) References Cited

U.S. PATENT DOCUMENTS

| | | | |
|---|---|---|---|
| 5,262,623 A * | 11/1993 | Batterman et al. | ........... 235/454 |
| 5,742,037 A | 4/1998 | Scola et al. | |
| 6,609,660 B1 * | 8/2003 | Stoner | ...................... 235/462.22 |
| 7,325,737 B2 | 2/2008 | Epshteyn et al. | |
| 7,392,951 B2 | 7/2008 | Ray et al. | |
| 7,478,753 B2 | 1/2009 | Patel et al. | |
| 7,559,473 B2 | 7/2009 | He | |
| 8,016,198 B2 | 9/2011 | May | |
| 8,322,617 B2 | 12/2012 | Cherry | |
| 8,469,275 B2 | 6/2013 | Dahari | |
| 2008/0105747 A1 * | 5/2008 | Orlassino | ................. G06K 7/14 235/462.41 |
| 2009/0057411 A1 | 3/2009 | Madej et al. | |
| 2010/0078477 A1 | 4/2010 | Wang et al. | |
| 2011/0068164 A1 | 3/2011 | Hanson et al. | |
| 2012/0132714 A1 * | 5/2012 | Rudeen | .............. G06K 7/10722 235/462.21 |
| 2012/0181338 A1 * | 7/2012 | Gao | ............................. 235/455 |

(Continued)

FOREIGN PATENT DOCUMENTS

WO    2009029654 A1    3/2009

OTHER PUBLICATIONS

International Search Report and Written Opinion mailed Jul. 8, 2015 in counterpart PCT application PCT/US2015/026660.

*Primary Examiner* — Thien M Le
*Assistant Examiner* — April Taylor

(57) ABSTRACT

A method of decoding a barcode includes determining number of barcode candidates in the image captured and processing the image captured in accordance with the number of barcode candidates found. If the number of barcode candidates is one, the image captured is processed to decode the only one barcode candidate in the image captured. If the number of barcode candidates is larger than one, the image captured is processed to find a barcode candidate that overlays with an aiming location between a first location and a second location on a scan line and to decode the barcode candidate that is found that overlays with the aiming location.

18 Claims, 6 Drawing Sheets

(56) References Cited

U.S. PATENT DOCUMENTS

| | | | |
|---|---|---|---|
| 2013/0287258 A1* | 10/2013 | Kearney | G06K 7/10881 382/103 |
| 2015/0034724 A1* | 2/2015 | He | 235/462.08 |
| 2015/0178523 A1* | 6/2015 | Gelay | G06K 7/015 235/462.2 |
| 2015/0310247 A1* | 10/2015 | Todeschini | G06K 7/1443 235/454 |

* cited by examiner

DECODING BARCODE USING SMART LINEAR PICKLIST

BACKGROUND

Various electro-optical systems have been developed for reading optical indicia, such as barcodes. A barcode is a coded pattern of graphical indicia comprised of a series of bars and spaces of varying widths. In a barcode, the bars and spaces have differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more imaging sensors for reading and decoding barcodes are typically referred to as imaging-based barcode readers, imaging scanners, or imaging readers. An imaging sensor generally includes a plurality of photosensitive elements or pixels aligned in one or more arrays. Examples of imaging sensors include charged coupled devices (CCD) or complementary metal oxide semiconductor (CMOS) imaging chips.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
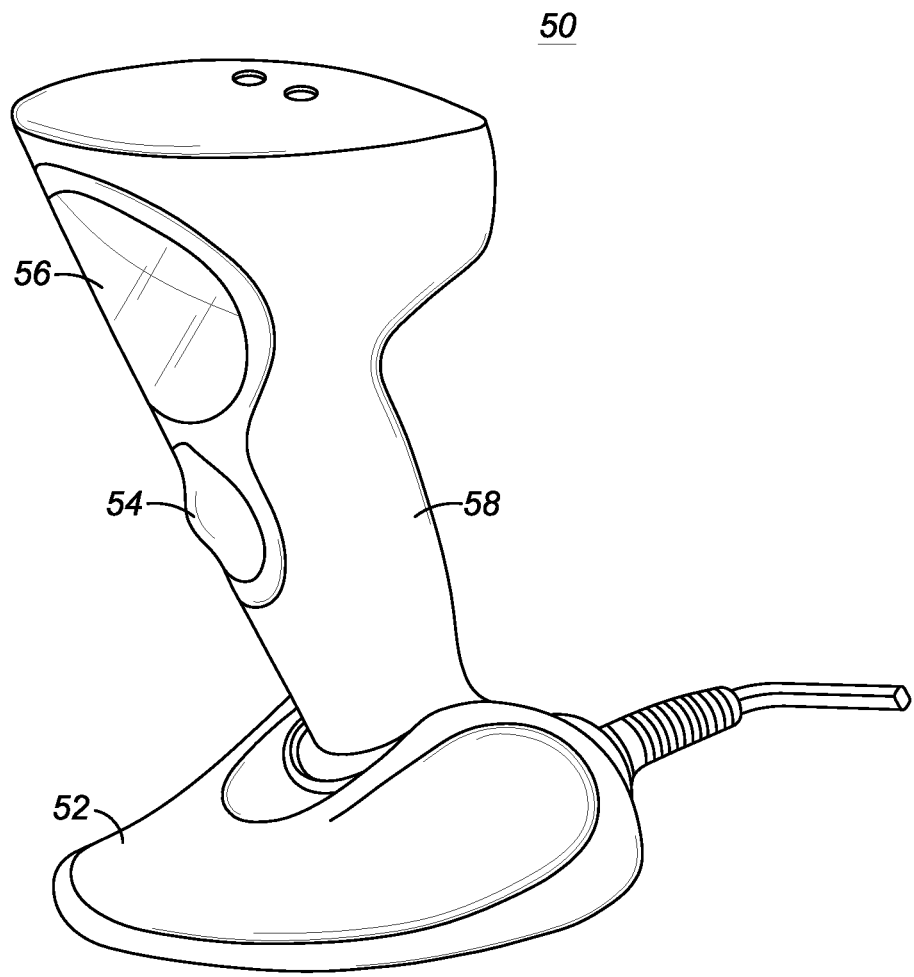
FIG. 1 shows an imaging scanner in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 shows an imaging scanner 50 in accordance with some embodiments. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes. In FIG. 1, a cable is also connected to the base 52. In other implementations, when the cable connected to the base 52 is omitted, the imaging scanner 50 can be powered by an on-board battery and it can communicate with a remote host by a wireless link.

Figure 2:
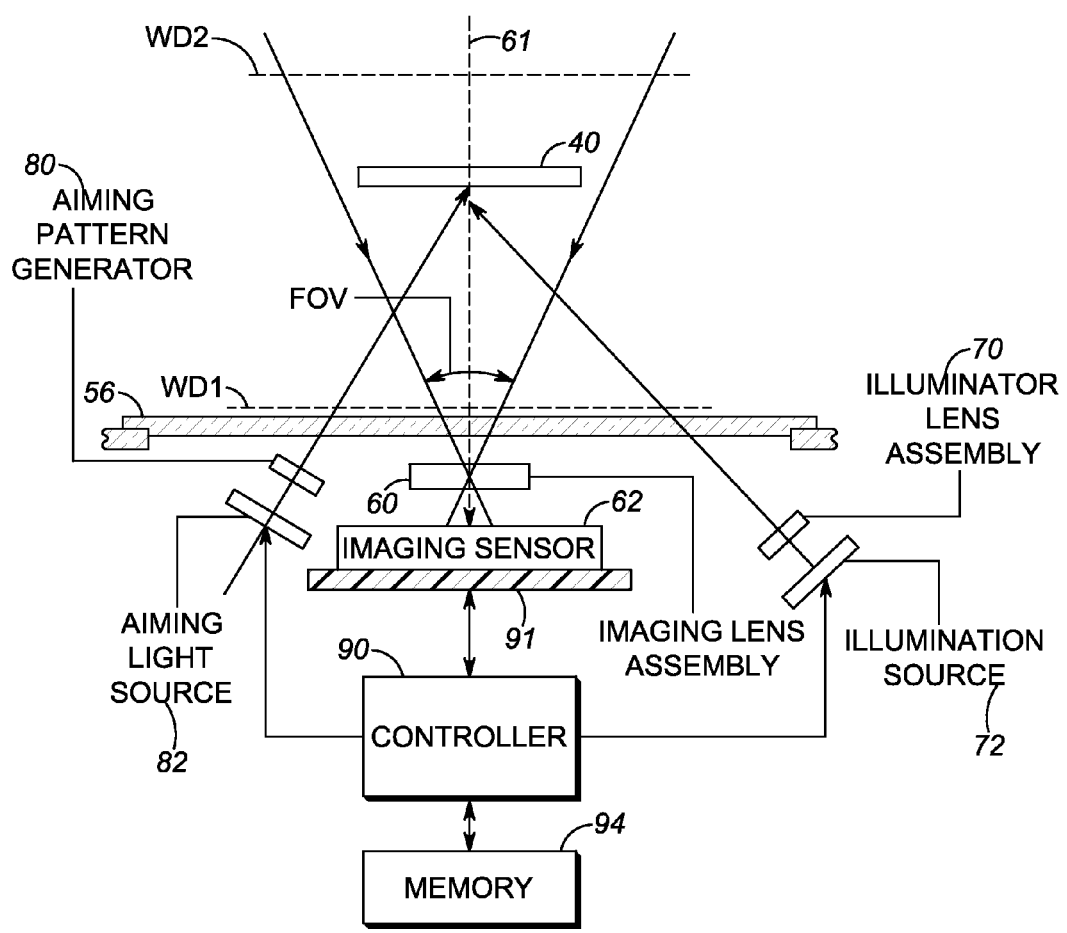
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) an imaging sensor 62 positioned behind an imaging lens arrangement 60; (2) an illuminating lens arrangement 70 positioned in front of an illumination source 72; (3) an aiming pattern generator 80 positioned in front of an aiming light source 82; and (4) a controller 90. In FIG. 2, the imaging lens arrangement 60, the illuminating lens arrangement 70, and the aiming pattern generator 80 are positioned behind the window 56. The imaging sensor 62 is mounted on a printed circuit board 91 in the imaging scanner.

The imaging sensor 62 can be a CCD or a CMOS imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens arrangement 60 along an optical path or axis 61 through the window 56. Generally, the imaging sensor 62 and the imaging lens arrangement 60 are designed to operate together for capturing light scattered or reflected from a barcode 40 as pixel data over a two-dimensional imaging field of view (FOV).

The barcode 40 generally can be located anywhere in a working range of distances between a close-in working distance (WD1) and a far-out working distance (WD2). In one specific implementation, WD1 is in a close proximity to the window 56, and WD2 is about a couple of feet from the window 56. Some of the imaging scanners can include a range finding system for measuring the distance between the barcode 40 and the imaging lens arrangement 60. Some of the imaging scanners can include an auto-focus system to enable a barcode be more clearly imaged with the imaging sensor 62 based on the measured distance of this barcode. In some implementations of the auto-focus system, the focus length of the imaging lens arrangement 60 is adjusted based on the measured distance of the barcode. In some other implementations of the auto-focus system, the distance between the imaging lens arrangement 60 and the imaging sensor 62 is adjusted based on the measured distance of the barcode.

In FIG. 2, the illuminating lens arrangement 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming pattern generator 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser, LED, or other kind of light sources.

In FIG. 2, the controller 90, such as a microprocessor, is operatively connected to the imaging sensor 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the imaging field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then exposes the imaging sensor 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

Figure 3:
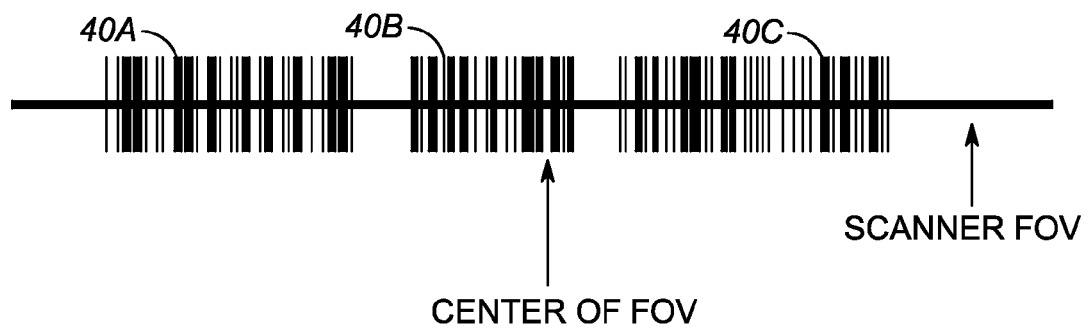
FIG. 3 shows three barcodes aligned with the field of view (FOV) of a linear imager.

Linear imagers use an array of sensors to decode 1D barcodes. Currently, most of the linear imager scanners only have a visible line of illumination that also indicates scanner's field of view (FOV). If there are more than one barcode in the field of view, the user may choose which barcode to decode by telling the scanner where the barcode is. For example, the user may ask the scanner to decode a barcode that covers the center of the field of view. This feature of decoding a barcode at a specific location is called "Picklist". FIG. 3 shows picking the barcode from three barcodes (i.e., 40A, 40B, and 40C) in the field of view. Here the aiming location is set to the middle of the FOV. The FOV is indicated by horizontal line.

Currently, many scanners on the market that have this "picklist" feature (maybe of different names) only decode the barcode that overlay the aiming location (or a window surrounding the aiming location). This will cause some inconvenience when user try to scan only one barcode and this feature is turned on. The user then must make sure the barcode overlay with the aiming location (often the center of FOV). When barcode is small or/and is far from the scanner, it occupies a small portion of scanner's FOV. In this case, the user must pay close/more attention to aiming at the barcode, which reduces scanning speed and productivity. Even worse, if the user is not aware that the picklist feature is on, the user may think the scanner cannot decode this barcode at all.

In this disclosure, smart picklist methods are described. Under this smart picklist mode, if there are multiple barcodes in scanner's field of view, it will only decode the barcode overlapping the aiming location, just like the picklist mentioned above. However, when there is only one barcode in the field of view, it will decode it regardless of its location in its FOV.

Figure 4:
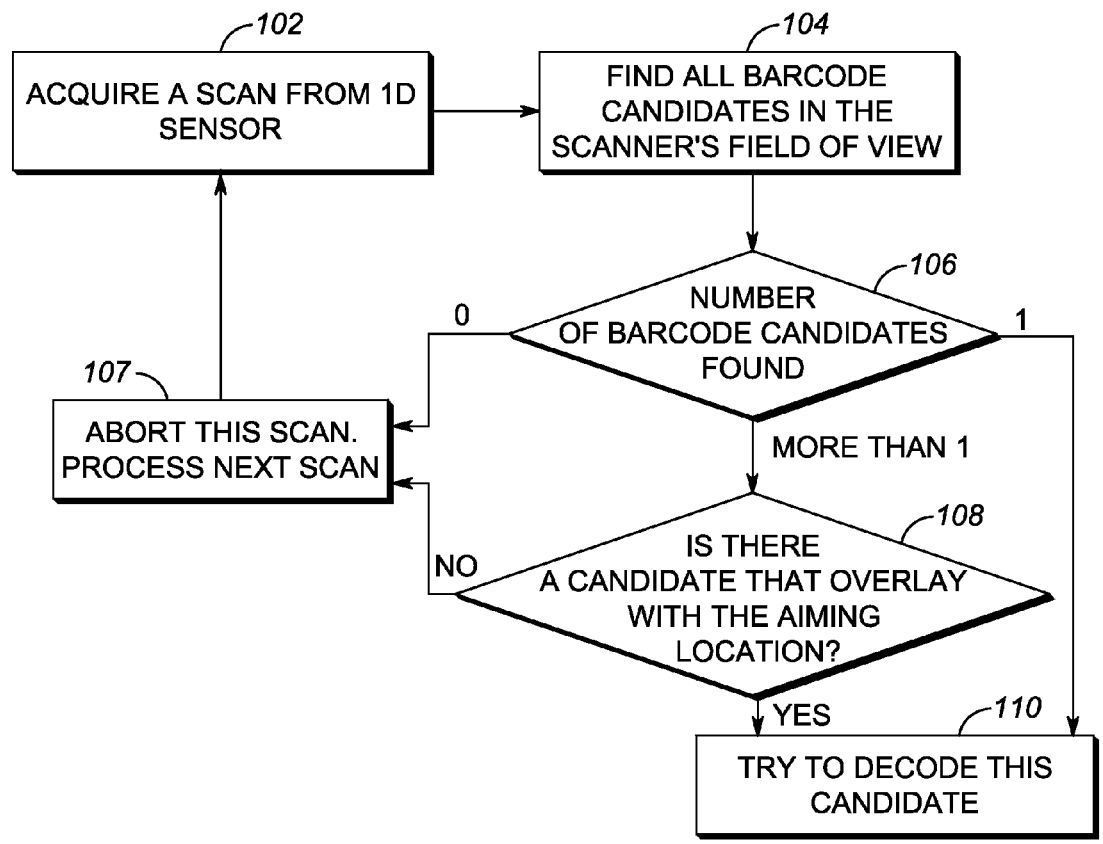
FIG. 4 is a flowchart of a method of decoding one or more barcodes with smart picklist mode in accordance with some embodiments.

FIG. 4 is a flowchart of a method 100 of decoding one or more barcodes with smart picklist mode in accordance with some embodiments. As shown in FIG. 4, at block 102, an image of the target object is captured with a scan from an imaging sensor. At block 104, all barcode candidates in the scanner's field of view are found from the captured image of the target object. At block 106, the number of the barcode candidates is determined. In a first scenario, if no barcode candidate is found in the scanner's of view, the scan will be aborted at block 107, and the scanner may continue to process the next scan. In a second scenario, if only one barcode candidate is found in the scanner's of view, the scanner will try to decode this barcode candidate at block 110. In a third scenario, if more than one barcode candidates are found in the scanner's of view, the scanner will try to determine, at block 108, whether there is a barcode candidate that overlays the aiming location. If there is a barcode candidate that overlays the aiming location, the scanner will try to decode this barcode candidate at block 110. If there is no barcode candidate that overlays the aiming location, the scan will be aborted at block 107, and the scanner may continue to process the next scan.

Figure 5A:
FIG. 5A is an example of a scan line crossing six closely placed barcodes.

FIG. 5A is an example of a scan line crossing six closely placed barcodes. The whole scan line has 1,500 pixels. In this example, the aiming location is centered at middle of the field of view, with a width of 1% of FOV. So if any barcode overlap with between pixels 743 to 758 is considered to be overlap with aiming location. The 4th barcode are between pixels 700 to 900. It overlaps with the aiming location and will be sent to decoder.

Figure 5B:
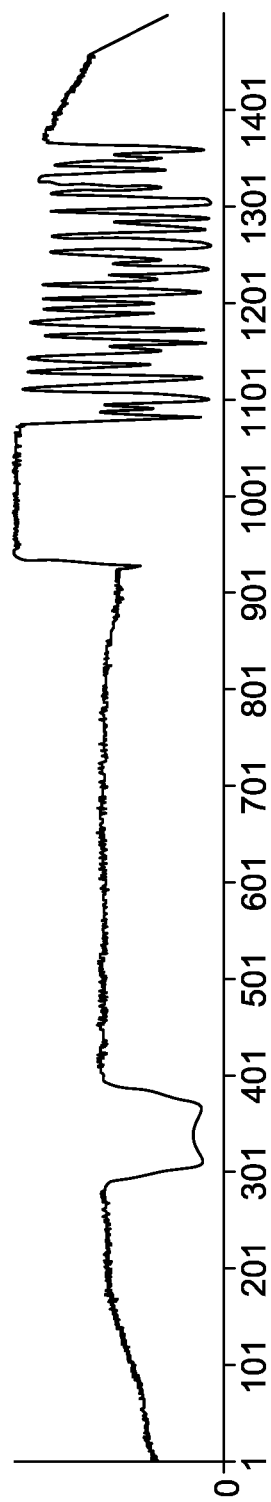
FIG. 5B is an example of a scan line crossing one barcode that is off-centered.

FIG. 5B is an example of a scan line crossing one barcode that is off-centered. The aiming location is the same as in the first example. Since there is only one barcode candidate detected, the decoder will try to decode it under this Smart Picklist mode.

The above described smart picklist method is not limited to linear imagers without visual aiming aid. Some linear imagers may have a LED or laser to indicate where the aiming location is. The proposed smart picklist is still applicable to this kind of scanner too.

In general, this disclosure is directed to a method of decoding a barcode within an imaging field of view of an imaging system that includes an imaging sensor having an array of photosensitive elements. The method includes the following: (1) generating an illumination towards a target object; (2) detecting light from the target object with the array of photosensitive elements in the imaging sensor while the target object is illuminated by the illumination to capture an image of the target object; (3) determining number of barcode candidates in the image captured; and (4) processing the image captured in accordance with the number of barcode candidates found. Specifically, if the number of barcode candidates is one, the method further includes processing the image captured to decode the only one barcode candidate in the image captured. On the other hand, if the number of barcode candidates is larger than one, the method further includes finding a barcode candidate that overlays with an aiming location between a first location and a second location on a scan line and further processing the image captured to decode the barcode candidate that is found.

In some implementations, the method can include detecting light from the target object with the array of photosensitive elements in the imaging sensor while the target object is illuminated by the illumination that is substantially uniform within the imaging field of view. In some implementations, the method can include detecting light from the target object with the array of photosensitive elements in the imaging sensor while the target object is illuminated by the illumination that is substantially uniform on the scan line.

In some implementations, the imaging sensor is a linear imaging sensor having a linear array of photosensitive elements. In some implementations, the linear imaging sensor can have N pixels, with the integer N being at least 512. In some implementations, the linear imaging sensor can have N pixels, with the integer N being at least 1024. In some implementations, the linear imaging sensor can have N pixels, with the integer N being at least 1600. In some implementations, the first location and the second location on the scan line can be separated by at least 8 pixels. In some implementations, the first location and the second location on the scan line can be separated by at least 16 pixels.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of decoding a barcode within an imaging field of view of an imaging system that includes an imaging sensor having an array of photosensitive elements, the method comprising:
  generating an illumination towards a target object;
  detecting light from the target object with the array of photosensitive elements in the imaging sensor while the target object is illuminated by the illumination to capture an image of the target object;
  determining number of barcode candidates in the image captured;
  if the number of barcode candidates is one, processing the image captured to decode the only one barcode candidate in the image captured regardless of such barcode candidate's location in the image captured and to store information obtained from decoding the only one barcode candidate as if the information is obtained from decoding a barcode at a specific location selected by a picklist feature; and
  if the number of barcode candidates is larger than one, finding a barcode candidate that overlays with an aiming location between a first location and a second location on a scan line and further processing the image captured to decode the barcode candidate that is found.

2. The method of claim 1, wherein said detecting includes detecting light from the target object with the array of photosensitive elements in the imaging sensor while the target object is illuminated by the illumination that is substantially uniform within the imaging field of view.

3. The method of claim 1, wherein said detecting includes detecting light from the target object with the array of photosensitive elements in the imaging sensor while the target object is illuminated by the illumination that is substantially uniform on the scan line.

4. The method of claim 1, wherein the imaging sensor is a linear imaging sensor having a linear array of photosensitive elements.

5. The method of claim 1, wherein said detecting includes detecting light from the target object with a linear imaging sensor having N pixels, with the integer N being at least 512.

6. The method of claim 1, wherein said detecting includes detecting light from the target object with a linear imaging sensor having N pixels, with the integer N being at least 1024.

7. The method of claim 1, wherein said detecting includes detecting light from the target object with a linear imaging sensor having N pixels, with the integer N being at least 1600.

8. The method of claim 1, wherein the first location and the second location on the scan line is separated by at least 8 pixels.

9. The method of claim 1, wherein the first location and the second location on the scan line is separated by at least 16 pixels.

10. The method of claim 1, wherein said detecting includes detecting light from the target object with the array of photosensitive elements in the imaging sensor to capture the image of the target object while the target object is illuminated by the illumination that is substantially uniform within the imaging field of view.

11. An apparatus comprising:
an imaging lens arrangement;
an imaging sensor including an array of photosensitive elements configured to operate together with the imaging lens arrangement for detecting light from a target object within an imaging field of view;
an illumination source for generating an illumination;
a controller configured for detecting light from the target object with the array of photosensitive elements in the imaging sensor while the target object is illuminated by the illumination to capture an image of the target object, and determining number of barcode candidates in the image captured; and
wherein the controller is further configured for, in the event that the number of barcode candidates is one, processing the image captured to decode the only one barcode candidate in the image captured regardless of such barcode candidate's location in the image captured and to store information obtained from decoding the only one barcode candidate as if the information is obtained from decoding a barcode at a specific location selected by a picklist feature, and in the event that the number of barcode candidates is larger than one, finding a barcode candidate that overlays with an aiming location between a first location and a second location on a scan line and further processing the image captured to decode the barcode candidate that is found.

12. The apparatus of claim 11, wherein the imaging sensor is a linear imaging sensor having a linear array of photosensitive elements.

13. The apparatus of claim 11, wherein said detecting includes detecting light from the target object with a linear imaging sensor having N pixels, with the integer N being at least 512.

14. The apparatus of claim 11, wherein said detecting includes detecting light from the target object with a linear imaging sensor having N pixels, with the integer N being at least 1024.

15. The apparatus of claim 11, wherein said detecting includes detecting light from the target object with a linear imaging sensor having N pixels, with the integer N being at least 1600.

16. The apparatus of claim 11, wherein the first location and the second location on the scan line is separated by at least 8 pixels.

17. The apparatus of claim 11, wherein the first location and the second location on the scan line is separated by at least 16 pixels.

18. A method of decoding a barcode within an imaging field of view of an imaging system that includes an imaging sensor having an array of photosensitive elements, the method comprising:
generating an illumination towards a target object;
detecting light from the target object with the array of photosensitive elements in the imaging sensor to capture an image of the target object while the target object is illuminated by the illumination that is substantially uniform on a scan line;
determining number of barcode candidates in the image captured;
if the number of barcode candidates is one, processing the image captured to decode the only one barcode candidate in the image captured regardless of such barcode candidate's location in the image captured and to store information obtained from decoding the only one barcode candidate as if the information is obtained from decoding a barcode at a specific location selected by a picklist feature; and
if the number of barcode candidates is larger than one, finding a barcode candidate that overlays with an aiming location between a first location and a second location on the scan line and further processing the image captured to decode the barcode candidate that is found.

* * * * *